(12) United States Patent
Jain

(10) Patent No.: US 12,317,113 B2
(45) Date of Patent: May 27, 2025

(54) SELF-INTERFERENCE CANCELLATION SUBSYSTEMS FOR MESH NETWORK NODES

(71) Applicant: GenXComm, Inc., Austin, TX (US)

(72) Inventor: Hardik Jain, Austin, TX (US)

(73) Assignee: GXC, LLC, Austin, TX (US)

( * ) Notice: Subject to any disclaimer, the term of this patent is extended or adjusted under 35 U.S.C. 154(b) by 364 days.

(21) Appl. No.: 17/731,879

(22) Filed: Apr. 28, 2022

(65) Prior Publication Data

US 2022/0353721 A1 Nov. 3, 2022

Related U.S. Application Data

(60) Provisional application No. 63/181,418, filed on Apr. 29, 2021.

(51) Int. Cl.
*H04W 24/10* (2009.01)

(52) U.S. Cl.
CPC .................... *H04W 24/10* (2013.01)

(58) Field of Classification Search
None
See application file for complete search history.

(56) References Cited

U.S. PATENT DOCUMENTS

| | | | |
|---|---|---|---|
| 4,608,569 A | 8/1986 | Dickey, Jr. et al. | |
| 5,377,289 A | 12/1994 | Johnson | |
| 5,444,864 A | 8/1995 | Smith | |
| 5,578,845 A | 11/1996 | Yoshiyuki et al. | |
| 5,699,176 A | 12/1997 | Cohen | |
| 5,701,371 A | 12/1997 | Ishida | |
| RE35,736 E | 2/1998 | Powell | |
| 5,757,312 A | 5/1998 | Szmurlo | |
| 5,867,293 A | 2/1999 | Kotten | |
| 5,904,546 A | 5/1999 | Wood et al. | |
| 6,359,714 B1 | 3/2002 | Imajo | |
| 6,373,909 B2 | 4/2002 | Lindquist | |
| 6,507,728 B1 | 1/2003 | Watanabe | |
| 6,539,204 B1 | 3/2003 | Marsh | |
| 6,567,648 B1 | 5/2003 | Ahn | |

(Continued)

FOREIGN PATENT DOCUMENTS

| | | |
|---|---|---|
| CN | 101379718 | 3/2009 |
| CN | 104484852 | 4/2015 |

(Continued)

OTHER PUBLICATIONS

International Search Report and Written Opinion issued Oct. 17, 2022 in corresponding PCT application No. PCT/US2022/026749.

(Continued)

*Primary Examiner* — Frantz Bataille
(74) *Attorney, Agent, or Firm* — Brownstein Hyatt Farber Schreck, LLP

(57) ABSTRACT

A mesh network node can include a self-interference cancellation subsystem. Operation of the self-interference cancellation subsystem enables persistent and/or continuous spectrum monitoring by the mesh network node. The mesh network node can transmit spectrum information at one or more intervals to a spectrum access server which can leverage spectrum information provided by multiple mesh nodes to optimize connections and/or links between nodes in the mesh network.

20 Claims, 11 Drawing Sheets

(56) References Cited

U.S. PATENT DOCUMENTS

| | | |
|---|---|---|
| 6,567,649 B2 | 5/2003 | Souissi |
| 6,745,018 B1 | 6/2004 | Zehavi |
| 6,751,447 B1 | 6/2004 | Jin |
| 6,760,454 B1 | 7/2004 | Shreve |
| 6,771,931 B2 | 8/2004 | Waltho |
| 6,778,319 B2 | 8/2004 | Chavez-Pirson |
| 6,873,639 B2 | 3/2005 | Zhang |
| 6,907,093 B2 | 6/2005 | Blount |
| 6,999,639 B2 | 2/2006 | Tsarev |
| 7,020,396 B2 | 3/2006 | Izadpanah |
| 7,058,368 B2 | 6/2006 | Nicholls |
| 7,064,697 B2 | 6/2006 | Taylor et al. |
| 7,085,497 B2 | 8/2006 | Tiemann |
| 7,116,484 B2 | 10/2006 | Nemoto |
| 7,123,676 B2 | 10/2006 | Gebara |
| 7,130,289 B2 | 10/2006 | Kuan et al. |
| 7,204,647 B2 | 4/2007 | Ohm |
| 7,355,993 B2 | 4/2008 | Adkins |
| 7,366,244 B2 | 4/2008 | Gebara |
| 7,446,601 B2 | 11/2008 | LeChevalier |
| 7,496,257 B2 | 2/2009 | Levner |
| 7,509,054 B2 | 3/2009 | Calabro et al. |
| 7,566,634 B2 | 7/2009 | Beyne et al. |
| 7,650,080 B2 | 1/2010 | Yap |
| 7,660,531 B2 | 2/2010 | Lee |
| 7,672,643 B2 | 3/2010 | Loh |
| 7,680,368 B2 | 3/2010 | Welch et al. |
| 7,711,329 B2 | 5/2010 | Aparin |
| 7,720,029 B2 | 5/2010 | Orava |
| 7,729,431 B2 | 6/2010 | Gebara |
| 7,756,480 B2 | 7/2010 | Loh |
| 7,778,611 B2 | 8/2010 | Asai |
| 7,809,047 B2 | 10/2010 | Kummetz |
| 7,826,808 B2 | 11/2010 | Faulkner |
| 7,853,195 B2 | 12/2010 | Higgins |
| 7,869,527 B2 | 1/2011 | Vetter |
| 7,876,867 B2 | 1/2011 | Filipovic |
| 7,907,895 B2 | 3/2011 | Shinagawa |
| 7,917,177 B2 | 3/2011 | Bauman |
| 8,036,606 B2 | 10/2011 | Kenington |
| 8,055,235 B1 | 11/2011 | Gupta et al. |
| 8,078,130 B2 | 12/2011 | Fudge |
| 8,081,946 B2 | 12/2011 | Fudge |
| 8,098,779 B2 | 1/2012 | Komninakis et al. |
| 8,155,605 B2 | 4/2012 | Hwang |
| 8,170,487 B2 | 5/2012 | Sahota et al. |
| 8,233,872 B2 | 7/2012 | Nagai |
| 8,249,540 B1 | 8/2012 | Gupta |
| 8,270,843 B2 | 9/2012 | Nakamoto |
| 8,299,555 B2 | 10/2012 | Su et al. |
| 8,320,504 B2 | 11/2012 | Peng |
| 8,331,509 B2 | 12/2012 | Wang |
| 8,351,874 B2 | 1/2013 | Dent |
| 8,477,871 B2 | 7/2013 | Neumann |
| 8,521,090 B2 | 8/2013 | Kim |
| 8,526,903 B2 | 9/2013 | Gudem |
| 8,565,681 B2 | 10/2013 | Kim |
| 8,600,200 B1 | 12/2013 | Rakich et al. |
| 8,618,966 B2 | 12/2013 | Kanter |
| 8,682,170 B2 | 3/2014 | Prucnal |
| 8,693,810 B2 | 4/2014 | Suarez et al. |
| 8,730,786 B2 | 5/2014 | Wang |
| 8,781,030 B2 | 7/2014 | Peng |
| 8,785,332 B2 | 7/2014 | Johnson et al. |
| 8,805,298 B2 | 8/2014 | McCallister |
| 8,845,854 B2 | 9/2014 | Lei et al. |
| 8,867,928 B2 | 10/2014 | Piehler |
| 8,872,583 B2 | 10/2014 | Lee |
| 8,971,712 B2 | 3/2015 | Fan et al. |
| 8,977,223 B1 | 3/2015 | Gupta |
| 9,020,307 B2 | 4/2015 | Ishikawa |
| 9,077,440 B2 | 7/2015 | Wyville |
| 9,100,099 B2 | 8/2015 | Loh |
| 9,106,453 B2 | 8/2015 | Wang |
| 9,160,386 B2 | 10/2015 | Rimini |
| 9,178,635 B2 | 11/2015 | Ben-Shlomo |
| 9,184,902 B2 | 11/2015 | Khojastepour |
| 9,195,052 B2 | 11/2015 | Long |
| 9,214,718 B2 | 12/2015 | Mow |
| 9,224,650 B2 | 12/2015 | Lei et al. |
| 9,252,857 B2 | 2/2016 | Negus |
| 9,253,003 B1 | 2/2016 | Harel |
| 9,257,811 B2 | 2/2016 | Gao |
| 9,258,052 B2 | 2/2016 | George |
| 9,268,092 B1 | 2/2016 | Jarecki, Jr. |
| 9,312,895 B1 | 4/2016 | Gupta |
| 9,344,125 B2 | 5/2016 | Kpodzo |
| 9,344,139 B2 | 5/2016 | Sjoland |
| 9,385,268 B2 | 7/2016 | Minamiru et al. |
| 9,391,667 B2 | 7/2016 | Sundstrom |
| 9,438,288 B2 | 9/2016 | Feld |
| 9,450,623 B2 | 9/2016 | Weissman |
| 9,490,963 B2 | 11/2016 | Choi |
| 9,520,983 B2 | 12/2016 | Choi et al. |
| 9,520,985 B2 | 12/2016 | Choi |
| 9,571,205 B1 | 2/2017 | Suarez |
| 9,589,812 B2 | 3/2017 | Takahashi et al. |
| 9,602,149 B1 | 3/2017 | Tanzi |
| 9,608,718 B2 | 3/2017 | Monsen |
| 9,651,652 B2 | 5/2017 | Kpodzo et al. |
| 9,667,404 B2 | 5/2017 | Sjoland |
| 9,696,492 B1 | 7/2017 | Cox |
| 9,698,913 B2 | 7/2017 | Foster |
| 9,703,046 B2 | 7/2017 | Paquet |
| 9,703,056 B2 | 7/2017 | Neelakantan et al. |
| 9,712,233 B1 | 7/2017 | Deng |
| 9,722,713 B2 | 8/2017 | Tanzi |
| 9,723,612 B2 | 8/2017 | Stapleton |
| 9,726,821 B2 | 8/2017 | Murray et al. |
| 9,735,056 B2 | 8/2017 | Takahashi et al. |
| 9,748,906 B2 | 8/2017 | Stewart |
| 9,768,852 B2 | 9/2017 | Ling |
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,887,862 B2 | 2/2018 | Zhou et al. |
| 9,900,044 B2 | 2/2018 | Sjoland |
| 9,923,593 B2 | 3/2018 | Andersson |
| 9,923,708 B2 | 3/2018 | Khandani |
| 9,948,377 B1 | 4/2018 | Kim et al. |
| 9,960,805 B2 | 5/2018 | Wyville |
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim |
| 10,064,217 B2 | 8/2018 | Rajagopal et al. |
| 10,084,506 B2 | 9/2018 | Sjoland |
| 10,110,306 B2 | 10/2018 | Jain et al. |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,284,367 B1 | 5/2019 | Le Ngoc |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |
| 10,367,584 B2 | 7/2019 | Rakich |
| 10,418,775 B2 | 9/2019 | Gao |
| 10,491,313 B2 | 11/2019 | Jain |
| 10,656,350 B2 | 5/2020 | Chen et al. |
| 10,663,663 B2 | 5/2020 | Painchaud |

(56) References Cited

U.S. PATENT DOCUMENTS

| | | | |
|---|---|---|---|
| 10,673,519 | B2 | 6/2020 | Hong |
| 10,727,945 | B1 | 7/2020 | Nguyen et al. |
| 10,754,091 | B1 | 8/2020 | Nagarajan |
| 10,873,877 | B2 | 12/2020 | Jain et al. |
| 11,032,005 | B2 | 6/2021 | Vishwanath et al. |
| 11,032,737 | B2 | 6/2021 | Jain et al. |
| 11,159,498 | B1 | 10/2021 | Mattis et al. |
| 11,215,755 | B2 | 1/2022 | Liu et al. |
| 11,469,821 | B2 | 11/2022 | Jain et al. |
| 2003/0161637 | A1 | 8/2003 | Yamamoto |
| 2004/0151238 | A1 | 8/2004 | Masenten |
| 2004/0264610 | A1 | 12/2004 | Marro |
| 2011/0065408 | A1 | 3/2011 | Kenington |
| 2011/0065409 | A1 | 3/2011 | Kenington |
| 2011/0134810 | A1 | 6/2011 | Yamamoto et al. |
| 2013/0295980 | A1 | 11/2013 | Reuven |
| 2014/0169236 | A1 | 6/2014 | Choi |
| 2014/0177660 | A1 | 6/2014 | Elmaanaoui |
| 2015/0296413 | A1 | 10/2015 | Sadek |
| 2016/0103341 | A1 | 4/2016 | Long |
| 2017/0176780 | A1 | 6/2017 | Levy et al. |
| 2018/0006795 | A1 | 1/2018 | Raaf |
| 2018/0248627 | A1 | 8/2018 | Daniel |
| 2019/0198999 | A1 | 6/2019 | Ashrafi |
| 2019/0394790 | A1* | 12/2019 | Damnjanovic ....... H04W 72/56 |
| 2020/0304253 | A1 | 9/2020 | Choi et al. |
| 2020/0305159 | A1* | 9/2020 | Raghothaman ... H04W 72/0453 |
| 2021/0036779 | A1 | 2/2021 | Nguyen et al. |
| 2021/0126669 | A1 | 4/2021 | Roberts et al. |
| 2021/0153073 | A1 | 5/2021 | Hain et al. |
| 2021/0297156 | A1 | 9/2021 | Jain et al. |
| 2021/0336050 | A1 | 10/2021 | Mattis et al. |
| 2022/0043211 | A1 | 2/2022 | Mattis et al. |
| 2022/0263529 | A1 | 8/2022 | Kokel |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | A 2011120120 | 6/2011 |
| JP | A 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

Amiri, I.S. et al., "W-Band OFDM Transmission for Radio-Over-Fiber Link Using Solitonic Millimeter Wave Generated by MRR" (Aug. 2014) IEEE Journal of Quantum Electronics 50(8): 622-628.

Amiri, I.S. et al., "2X2 MIMO-OFDM-RoF generation and transmission of double V-Band signals using a microring resonator system" (Dec. 12, 2015) Optical and Quantum Electronics, Springer US, NY vol. 48:1 1-15.

Blumenthal, D.J., "Photonic integration for UV to IR applications" (2020) APL Photonics 5: 020903 (12 pages).

Huffman, T.A. et al., "Integrated Resonators in an Ultralow Loss Si3N4/SiO2 Platform for Multifunction Applications" (Jul./Aug. 2018) IEEE Journal of Selected Topics in Quantum Electronics vol. 24, No. 4 (9 pages).

Quan et al., "A Novel Phase Noise Mitigation Method for Full-Duplex Transceivers" 2019 11th International Conference on Wireless Communications and Signal Processing (WCSP) IEEE Oct. 23, 2019 pp. 1-6.

Sahai et al., "Understanding the Impact of Phase Noise on Active Cancellation in Wireless Full-Duplex" Asilomar Conference on Signals, Systems and Computers Conference Record, IEEE Computer Society pp. 29-33 Nov. 12, 2012.

Syrjälä et al., "Analysis of Oscillator Phase-Noise Effects on Self-Interference Cancellation in Full-Duplex OFDM Radio Transceivers" IEEE Transactions on Wireless Communications vol. 13, No. 6, pp. 2977-2990 Jun. 6, 2014.

Zhu, D. et al., "Integrated photonics on thin-film lithium niobate" (Feb. 23, 2021) arxiv.org, Cornell University Library, 201 Olin Library Cornell University Ithaca, NY 14853 (94 pages).

Chang et al., "Full-duplex spectrum sensing in cognitive radios using optical self-interference cancellation," 2015 9th International Conference on Sensing Technology (ICST), IEEE, pp. 341-344, Dec. 8, 2015.

IBM, "Silicon Nanophotonic Packaging," https://researcher.watson.ibm.com/researcher/view_group_subpage.php?id=5522, Jul. 2016.

Kwak, MyoungJun, "The Impact of Loop Filter in Phase Locked Loop," Bachelor's Thesis Metropolia University of Applied Sciences, Feb. 19, 2019, 50 pages.

Lecture 150—Phase Noise—1 (Jun. 20, 2003), P.E. Allen 2003, 2 pages.

Li et al., "Multimode silicon photonics," Nanophotonics, vol. 8, No. 2, pp. 227-247, May 16, 2019.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Mothe et al., "Multichannel Microwave Photonics Signals Summation Device," IEEE *Photonics Technology Letters*, vol. 3, No. 3, pp. 140-142, Feb. 1, 2011.

Skyworks AN279, "Estimating Period Jitter from Phase Noise," Skyworks Solutions, Inc., Sep. 21, 2021, 8 pages.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Yoo et al., "Heterogeneous 2D/3D photonic integrated microsystems," *Microsystems & Nanoengineering*, 2, 16030, Aug. 2016.

\* cited by examiner

SELF-INTERFERENCE CANCELLATION SUBSYSTEMS FOR MESH NETWORK NODES

CROSS-REFERENCE TO RELATED APPLICATION(S)

This application is a nonprovisional of, and claims the benefit under 35 U.S.C. 119(e) of, U.S. Provisional Patent Application No. 63/181,418, filed Apr. 29, 2021, and entitled "CBRS Mesh Nodes for Wireless Networks," the contents of which are incorporated herein by reference as if fully disclosed herein.

TECHNICAL FIELD

Embodiments described herein relate to communication systems, and in particular, to mesh communication systems that incorporate a self-interference cancellation subsystem.

BACKGROUND

A radio access network serving one or more user equipment can be implemented with a mesh topology including two or more communicably intercoupled nodes. A node of a mesh network can include a transmitter and a receiver to communicate with other nodes and user equipment. In many cases, signals output from the transmitter are undesirably incident upon the receiver, interfering with operation of the receiver. This interference is referred to as "self-interference."

For mesh nodes, self-interference effects can degrade performance of inter-node communications, backhaul communications, and user equipment communications. As a result, conventional mesh networks defined by conventional mesh nodes typically exhibit a bandwidth ceiling lower than non-mesh network topologies and, additionally, typically exhibit a latency floor often higher than non-mesh network topologies.

SUMMARY

Embodiments described herein take the form of a mesh node including a self-interference cancellation subsystem. The self-interference cancellation subsystem, in many embodiments, includes a filter bank, a processor resource, and a memory resource. The processor resource is configured to access the memory resource to retrieve at least one executable asset therefrom, and to operate with the memory resource to instantiate an instance of software (which may be application level, kernel level, firmware level, or any other suitable software product) configured to select and/or set at least one operational parameter of the self-interference cancellation subsystem.

For example, the instance of software can be configured to select at least one filter from the filter bank to mitigate at least a portion of self-interference resulting from operation of a transmitter subsystem of the mesh node.

The self-interference cancellation subsystem can be operated by the mesh node to mitigate self-interference when transmitting signals to (and/or receiving signals from) a user equipment, when communicating with another mesh node, and/or when communicating with a gateway node or base station.

In some cases, a mesh node as described herein can be configured to leverage the self-interference cancellation subsystem to monitor local spectrum for sources of interference. In some examples, the mesh node can leverage spectrum information to, without limitation: select one or more channels to communicate with a user equipment, gateway node, or other mesh node; select one or more communications protocols to communicate with a user equipment, gateway node, or other mesh node; to locate one or more interference sources (in RF domain and/or physical location); and so on.

In many embodiments, a mesh node as described herein can be configured to transmit spectrum information to an interference management controller and/or spectrum access server so that the interference management controller can inform spectrum allocation decisions based at least in part on local spectrum information. In this manner, each node of a mesh network can serve to operate as a spectrum sensor providing output leveraged by a spectrum access server to efficiently allocate spectrum to user equipment, particular nodes, particular base stations, particular gateways, and so on.

In some embodiments, a mesh node as described herein can be operated to facilitate direct communications between two or more user equipment devices. For example, a shortest path from a first user equipment to a second user equipment through the mesh network can be determined (e.g., via Dijkstra's algorithm or a similar pathfinding algorithm) by one or more mesh nodes and/or a central node. Once a shortest path (or any other suitable intra-mesh path, if not shortest) is determined, the first user equipment can directly communicate with the second user equipment. For example, a voice call between the first user equipment and the second user equipment can be connected without requiring associated data packets to traverse a core network and/or a public switched telephone network. These constructions reduce load on a core network and public switched telephone networks and reduce latency of communications between user equipments.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
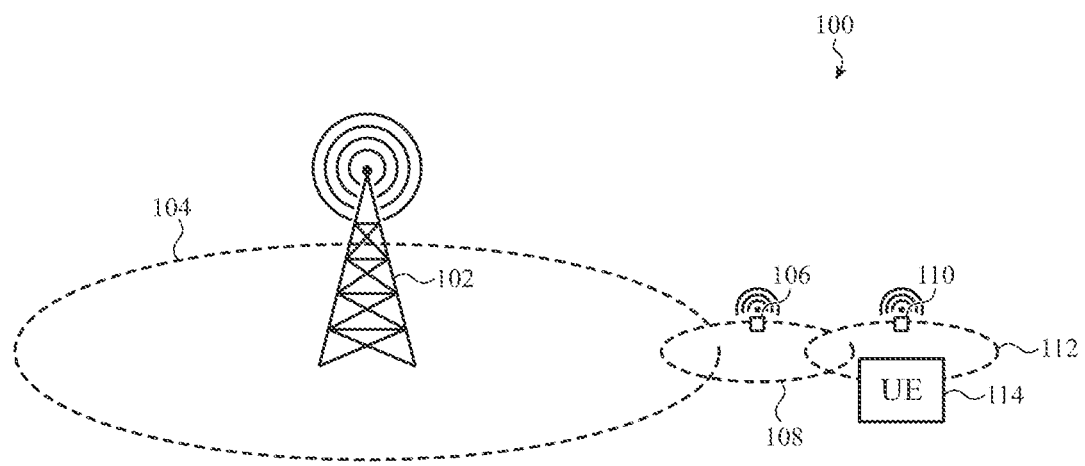
FIG. 1 depicts a radio access network including mesh nodes, as described herein.

Certain accompanying figures include vectors, rays, traces and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more antennas shown or, or in some cases, omitted from, the accompanying figures. It is understood that these simplified visual representations of electromagnetic energy regardless of spectrum (e.g., radio, microwave, VHF, UHF, millimeter wave, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, or direction, to the exclusion of other embodiments described or referenced herein. Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for controlling one or more operations of a wireless communications device in a radio access network to optimize spectrum utilization, power efficiency, transmission symbol rate, and/or receiver signal-to-noise ratios.

In many embodiments, the wireless communications device may be further configured to communicably couple to an interference management controller (and/or a spectrum access server) and to provide to the interference management controller information (e.g., as structured data) corresponding to RF spectrum characteristics local to the wireless communications device; more simply, in many embodiments, a wireless communications device as described herein can be configured to operate as a persistent, always-on, or on-demand spectrum sensor that can inform spectrum allocation determinations and/or other operations of a spectrum access server. In many cases, a receiver subsystem of a wireless communications device can be configured to sense spectrum such as described herein.

More specifically, many embodiments described herein relate to mesh networks and, specifically, wireless communications devices configured for use as nodes of a mesh network. In embodiments described herein, a node of a mesh network (herein, a "mesh node") is a radio communications electronic device configurated to participate in a mesh network topology and/or to communicably intercouple to a core network (e.g., via a gateway or base station node) and to one or more user equipment devices, such as laptops, cell phones, desktop devices, industrial control devices, warehouse monitoring devices, and so on.

In many embodiments, although not required, a mesh network as described herein may be configured to define a private cellular network that may be used, for example, within a building, warehouse, industrial complex, underground, or another location which may not be effectively served by public access cellular networks.

In some cases, a mesh network as described herein may be configured to serve user equipment (e.g., facilitate a connection between the user equipment and a core network, that may couple to a private intranet and/or the open Internet or other networks) such as cellular phones, handheld devices, inventory tracking devices, automation devices, Internet-of-things devices, industrial control devices, manufacturing equipment, personal electronic devices, or any other suitable electronic device. It may be appreciated that these foregoing examples are not exhaustive; a network as described herein can be deployed for a number of suitable purposes and may be configured to wirelessly or otherwise couple to one or more user equipment devices, which may be stationary or mobile.

As described herein, a mesh network includes several mesh nodes. Each mesh node can be configured to communicate with other mesh nodes (e.g., for network optimization), user equipment devices, and/or to one or more gateway devices or base station nodes that in turn couple to a core network. Communication links between individual nodes can be optimized appropriately; in some cases optimization may occur on demand of a network operator and/or may occur automatically or in response to occurrence of a trigger event.

In general, a mesh node as described herein can include a backhaul communications link or channel, one or more user equipment access communications links or channels, and one or more mesh communications links or channels. The backhaul communications link can be leveraged to communicably couple the mesh node to a core network; in some configurations, a given mesh node may not be directly coupled to a core network. The access communications links can be leveraged to communicably couple the mesh node to one or more user equipment devices. The mesh communication links can be leveraged for mesh network communications and mesh network administration. Each of the communications channels can be wired or wireless and may leverage any suitable protocol or combination of protocols. For example, in some embodiments, a backhaul channel may be a fiberoptic connection, an access channel may be established over a first cellular standard for some user equipment and a second cellular standard for other user equipment, and a mesh channel may be established via microwave link. In other cases, more than one channel may communicate over the same protocol and/or over the same channels.

In addition, a mesh node as described herein includes a transmitter subsystem, a receiver subsystem, and at least one antenna. The transmitter subsystem and receiver subsystem can cooperate to define a radio element of the mesh node, which in turn can be leveraged to establish a backhaul channel, an access channel, or a mesh channel as described above.

Many implementations include an antenna array leveraged as a phased array for beamforming and/or MIMO purposes, although this may not be required of all embodiments. For simplicity of description the embodiments that follow reference radio elements that feed antenna arrays, but it is appreciated that this is merely one example configuration.

A transmitter subsystem of a mesh node as described herein is configured to generate one or more feed signals to an antenna array to transmit one or more signals to one or more recipients/receiver devices. Similarly, a receiver subsystem of a mesh node is configured to receive one or more feed signals from an antenna array.

In many cases, in addition to one or more radio elements (each including a transmitter subsystem and/or a receiver subsystem as described above), a mesh node as described herein can also include a processing resource and a memory resource, which may be separate or integrated together. Either or both the processing resource or memory resource can be virtualized over physical hardware, such as a physical processor and a physical memory. Whether virtual or otherwise, the processing resource can be configured to communicably intercouple with the memory resource (virtual or otherwise) and can be configured to cooperate with the memory resource to instantiate one or more instances of software configured to control, perform, or coordinate one or more actions or operations of the mesh node and/or a radio element thereof.

As noted above, a transmitter subsystem and receiver subsystem of a radio element of a mesh node as described herein can be configured to communicably couple—either wirelessly or otherwise—to one or more gateway nodes, one or more other mesh nodes, and/or one or more user equipment. It may be appreciated by a person of skill in the art that a mesh node can communicate with any one of these devices over any suitable wireless or wired protocol including, for example, 3rd Generation Partnership Project (3GPP) long term evolution (LTE) (e.g., 4G), 3GPP new radio (5G NR) and IEEE 802.11 standard for wireless local area networks (WLAN) (commonly known to industry groups as Wi-Fi®).

A transmitter subsystem and/or receiver subsystem of a radio element of a mesh node as described herein can be configured to communicate over multiple protocols. For example, a mesh node may be configured to communicate with a user equipment over Wi-Fi and additionally configured to communicate with other mesh nodes over LTE, point-to-point microwave links, or any other suitable communications protocol.

More generally, it may be appreciated that different wireless communication systems standards and protocols can be leveraged by various radio access networks for communicating between devices and nodes as described herein. Examples of standardized wireless communications protocols known to a person of skill in the art include but are not limited to: Long-Term Evolution (LTE); Enhanced Data for Global Evolution (EDGE); Global System for Mobile (GSM); GSM EDGE Radio Access Network (GERAN); Universal Terrestrial Radio Access Network (UTRAN); Universal Mobile Telecommunications System (UMTS); Evolved UTMS Terrestrial Radio Access (E-UTRA); Next Generation Radio Access Network (NG-RAN); 3GPP Fifth Generation New Radio (5G NR); Wi-Fi; Bluetooth; ZigBee; Z-Wave; low-rate wireless personal area network (LR-WPAN); and so on.

Generally and broadly, in view of the foregoing, it may be appreciated that a mesh node as described herein can be implemented with one or more radio elements to define backhaul channels, access channels, and/or mesh channels. Each radio element, in many embodiments (although not required), includes a transmitter subsystem and a receiver subsystem. In other embodiments, different radio elements can share a transmitter subsystem and/or a receiver subsystem. Protocol implementation and adherence can be facilitated by software instantiated by interoperation of a processor resource and memory resource.

Radio element embodiments described herein further include a self-interference cancellation subsystem operably coupled to at least one transmitter subsystem and at least one receiver subsystem. In many cases, the self-interference cancellation subsystem is operably coupled to transmitter and receiver subsystems of the same radio element, but this is not required of all embodiments. A self-interference cancellation subsystem may be specific to a particular radio element of a mesh node, or may be a subcomponent of the mesh node itself, operating with one or more radio elements. These examples are not exhaustive.

Generally and broadly, a self-interference cancellation subsystem of a mesh node (or a radio element) as described herein is configured to mitigate effects of self-interference. More specifically, a self-interference cancellation subsystem is configured to tap a feed line and/or baseband signal line of a transmitter subsystem and to leverage that input to generate a cancellation signal that can be combined with signals received at a receiver subsystem to cancel effects of a transmitter subsystem incident upon a receiver subsystem.

As a result of these constructions, a transmitter subsystem and a receiver subsystem can operate simultaneously over overlapping and/or identical bandwidth in full-duplex modes. In addition, multiple radio elements with multiple transmitter subsystems and multiple receiver subsystems can be configured to operate simultaneously without (significantly) interfering with one another. More specifically, in these embodiments, transmitted signals from one radio element can be used to generate a cancellation signal applied to received signals of another radio element.

More simply, as a result of self-interference cancellation subsystems as described herein, receiver subsystems of radio elements can operate simultaneously and over the same bandwidth as transmitter systems, thereby increasing throughput of the mesh node.

The self-interference cancellation subsystem can be constructed and implemented in a number of suitable ways. In many cases, one or more channel characteristic estimation operations can determine phases and/or amplitudes of transmitted signals reflected back to, and received by, the receiver subsystem.

The self-interference cancellation subsystem may operate at baseband in a digital domain or an analog domain. In other cases, the self-interference cancellation subsystem can include one or more RF-to-optical converters, one or more photonic delay elements, and one or more optical-to-RF converters. Output from the one or more optical-to-RF converters can be combined with one or more signals received by a receiver subsystem to cancel effects of transmitted signals. In yet other examples, the self-interference cancellation subsystem can include submodules operating in baseband domains, analog domains, digital domains, RF domains, optical domains, acoustic domains, or any combination thereof.

As a result of these described constructions, a mesh node of a mesh network as described herein can leverage a self-interference cancellation subsystem to improve overall performance, spectrum utilization, power consumption, and overall quality of service to user equipment.

More particularly, as may be appreciated, a mesh node including a self-interference cancellation subsystem as described herein can leverage the self-interference cancellation subsystem to effectively monitor local spectrum nearby the mesh node (e.g., by operation of a receiver subsystem of the mesh node) particularly, because the self-interference cancellation subsystem operates to effectively cancel RF power introduced to the environment by the mesh node (e.g., any transmitted signals originating from the mesh node are canceled or significantly attenuated), the mesh node can effectively monitor local spectrum for external sources of interference.

In addition, a mesh node configured to monitor local spectrum via a receiver subsystem by leveraging a self-interference cancellation subsystem (and/or more than one subsystem working in concert), as described herein, can use spectrum information to inform one or more channel use decisions or determinations, one or more protocol use decisions or determinations, and so on. In addition, the mesh node can communicate real-time or near real-time spectrum information to other adjacent mesh nodes, gateway nodes, and/or to one or more spectrum access servers.

In embodiments in which a spectrum access server (and/or an interference management controller) receives real-time spectrum information from at least one of a set of mesh nodes in a mesh network, the spectrum access server can perform more accurate and efficient spectrum allocation decisions. In addition, the spectrum access server can determine and/or locate one or more sources of interference and generate recommendations/notifications or trigger automatic actions to mitigate effects of unknown-source interference.

For example, if a mesh node detects and reports an interference source over channels typically associated with LTE cellular traffic, a spectrum access server communicably coupled to the mesh node may determine that a protocol other than LTE should be used to couple to user equipment from the reporting mesh node. In other cases, the spectrum access server can determine that because certain LTE channels are likely occupied, the reporting mesh node should use different LTE channels to communicate with LTE devices.

In yet other examples, a spectrum access server (or other server consuming spectrum information from one or more nodes as described herein) can be configured to consume spectrum information from multiple mesh nodes. The spectrum information, which may be obtained by operation of a receiver subsystem as described herein, can be cross-correlated or otherwise analyzed to triangulate physical locations of interference-generating radio devices. For example, spectrum information detected at a first time from a first mesh node can be correlated to spectrum information detected at the first time from a second mesh node and a third mesh node. It may be appreciated by a person of skill in the art that such a spectrum measurement, synchronized across multiple nodes, is made possible by operation of the self-interference cancellation subsystem; absent a self-interference cancellation subsystem, all nodes of the network would need to synchronously stop transmitting in order to synchronously detect spectrum.

Based on respective differences in amplitude between spectrum contentment detected at each node, the spectrum access server may be able to triangulate an approximate location of the source of interference received at each node. With this information, the spectrum access server can raise an issue with a network administrator to investigate the interference source. In other examples, the spectrum access server or other processing device can execute an optimization algorithm to reposition one or more mesh nodes to avoid the interference source. In yet other examples, the spectrum access server can communicate with one or more other networks, such as a public access cellular network, to identify the source of interference and request the interference source operate in a less interfering manner.

In yet other examples, spectrum information as described herein can be leveraged for other purposes, including but not limited to: determining or predicting which protocols are being used in a particular geographic location; determining or predicting traffic patterns based on moving or periodic interference sources; determining or predicting occupancy patterns based on moving or periodic interference sources; and so on.

These foregoing example embodiments are not exhaustive. It may be appreciated that generally and broadly, a mesh network as described herein can include two or more mesh nodes which, in turn, can include one or more radio elements. Each radio element can be associated with a transmitter subsystem and a receiver subsystem that are configured to interoperate with a self-interference cancellation subsystem such that signals output from the transmitter subsystem incident upon the receiver subsystem are attenuated and/or eliminated. In these embodiments, the transmitter subsystem can be configured to transmit a "transmitted signal," and the receiver subsystem to receive a "received signal." The self-interference cancellation subsystem can be configured to generate a "cancellation signal" from the transmitted signal such that, if the cancellation signal is combined with the received signal (in the digital domain, the analog domain, at baseband, and/or in the RF/microwave/carrier domain), the cancellation signal destructively interferes with the received signal to attenuate, or eliminate, effects that the transmitted signal may have on the received signal.

More simply, the cancellation signal of such embodiments reduces interference by the transmitter subsystem with the receiver subsystem so that the transmitter subsystem and receiver subsystem can operate in some examples simultaneously, with the same antenna resources, and/or within overlapping bands.

These foregoing and other embodiments are discussed below with reference to FIGS. 1-11. However, those skilled in the art will readily appreciate that the detailed description given herein with respect to these figures is for explanation only and should not be construed as limiting.

FIG. 1 depicts a radio access network including mesh nodes, as described herein. The radio access network 100 can be used to internetwork one or more user equipment devices. The user equipment devices that couple to the radio access network 100 can be any suitable user equipment devices, and may include without limitation: cellular telephones; internet-of-things devices; desktop computers; wearable electronic devices; infrastructure sensors; vehicle communication devices; industrial automation devices; industrial robotics; building automation systems; and so on. It may be appreciated that these are not exhaustive.

The radio access network 100 can implement any suitable number of wireless communication protocols. In many embodiments, the radio access network 100 is configured to provide public or private cellular network access network, with backhaul communicably coupled to a private intranet and/or to the public internet.

It may be appreciated that this described network topology is merely one example construction; a person of skill in the art may readily appreciate that a radio access network such as the radio access network 100 can be implemented in a number of suitable ways.

In particular, in the illustrated embodiment, the radio access network 100 includes a base station 102 that defines a service area 104. The base station 102 (also referred to as a cell site) can be configured to communicate with any suitable user equipment within the service area 104. In some cases, the base station 102 is configured for 5G NR operation or LTE operation, but these are merely examples. In other cases, the base station 102 can be configured to provide service over Wi-Fi.

The service area 104 overlaps a mesh node 106, which provides a service area 108. In addition, the radio access network 100 includes a mesh node 110 providing a service area 112. A user equipment 114 within the service area 112 can communicably couple to the mesh node 110, which in turn couples to the mesh node 106, which in turn couples to the base station 102. In this topology, the user equipment 114 can intercouple to one or more networks via one or more mesh nodes and/or one or more base stations.

As with other embodiments described herein, the mesh node 106 and the mesh node 110 can each maintain multiple discrete communication channels, such as a backhaul channel, an access channel, and a mesh channel.

In many cases, the backhaul channel can be leveraged to communicably intercouple the mesh node 106 to the base station 102. In other cases, either or both the mesh node 106 and the mesh node 110 can include a wired connection to a core network.

The access channel maintained by the mesh nodes 106, 110 can be used to communicably couple to the user equipment 114 and/or other user equipment devices. The user equipment devices can be fully capability devices or reduced capability devices. The user equipment devices can be stationary or mobile. Any suitable number of user equipment devices can couple to a mesh node, such as the mesh nodes 106, 110 as described herein.

The mesh channel maintained by the mesh nodes 106, 110 can be used to communicate between individual mesh nodes. For example, in some cases, a mesh channel can be used to communicate command and control instructions to each node of a mesh network such as the radio access network 100. In other cases, the mesh channel can be leveraged to optimize network performance by defining mesh-to-mesh links that reduce a number of nodes a particular packet or signal is required to traverse before reaching a backhaul coupling to a core network. These examples are not exhaustive; a mesh channel can be used for a number of suitable purposes.

In many embodiments, the mesh channel, access channel, and/or backhaul channel can be defined over different protocols. For example, in one embodiment, a backhaul channel defined between the mesh node 106 and the base station 102 may be established over a point to point microwave link. In this example, an access channel defined by the mesh node 106 (available within the service area 108) can leverage 5G NR.

These foregoing examples are not exhaustive; generally and broadly it may be appreciated that different communications channels defined by and/or maintained by a mesh node as described herein can use the same protocols or different protocols; implementations may differ.

As with other embodiments described herein, the mesh nodes 106, 110 can each include one or more radio elements. Each radio element can be dedicated to establish a communication channel used by the mesh nodes to perform one or more functions of the mesh nodes. In other cases, a single radio element operable in multiple modes may be used. A person of skill in the art may appreciate that a mesh node, such as the mesh nodes 106, 110 can be configured with any suitable number of radio elements.

Each radio element of a mesh node (such as the mesh nodes 106, 110) can include and/or can be associated with a transmitter subsystem, a receiver subsystem, and a self-interference cancellation subsystem.

As with other embodiments described herein, the self-interference cancellation subsystem operates to mitigate effects of operating the transmitter subsystem simultaneously with the receiver subsystem (or other receiver subsystems or other radio elements of the mesh node). For example, in some embodiments, the self-interference cancellation subsystem taps a feed line of the transmitter subsystem and provides signals received at that tap into a configured filter array, which selectably delays one or more copies of the tapped signal to counteract environmental reflections of the transmitted signal that are incident upon the receiver subsystem.

In many cases, the tap received by the self-interference cancellation subsystem can be converted from an RF-domain (e.g., carrier-modulated) signal into an optical signal via an RF-to-optical signal converter. Thereafter, the resulting optical signal can be delayed by passing it through a delay element including a waveguide of known length. At the output of the delay element, the optical signal can be converted back into an RF-domain signal (e.g., via a high speed photodiode) which can be combined with one or more received signals received by a receiver subsystem of the mesh node. As a result of this construction, environmental reflections of transmitted signals can be effectively cancelled from received signals.

The self-interference cancellation subsystem can select appropriate delays to apply to tapped transmitter subsystem feed lines in any suitable way.

In some embodiments, the self-interference cancellation subsystem can be configured to provide self-interference cancellation in baseband domain. In other cases, digital and analog self-interference cancellation techniques can be leveraged to further improve receiver subsystem signal to noise ratios. More generally, it may be appreciated that the self-interference cancellation subsystem can be configured in a number of suitable ways to cancel interference generated by the mesh node (by operation of any suitable communication channel).

In many embodiments, the self-interference cancellation subsystem can be further leveraged to improve local spectrum sensing operations performed by a receiver subsystem or other spectrum sensing system of the mesh nodes 106, 110. For example, a radio element—and in particular a receiver subsystem of the radio element—of the mesh nodes 106, 110 can be used to monitor/measure local spectrum. As with other radio elements describe herein, operation of the self-interference cancellation subsystem can mitigate effects of any signals transmitted from the mesh node. In this manner, more generally, the mesh nodes 106, 110 can be configured to monitor local spectrum—while transmitted—as though the mesh node itself were not transmitting. It may be appreciated such spectrum measurements are not possible with conventional mesh nodes.

As with other embodiments described herein, spectrum information and/or spectrum measurements can be used for a number of purposes. In some example embodiments, spectrum information measured by a mesh node can be communicated to a spectrum access server that in turn can use that information to inform one or more spectrum allocation decisions or determinations for a particular network.

In other embodiments, spectrum information can be used to identify a source of interference. For example, spectrum information measured by the mesh node 106 can be correlated to spectrum information measured by the mesh node 110 to identify and/or triangulate an interference source within an area within the service area 108 and the service area 112. In some cases, beam index information from the mesh nodes 106, 110 can be used to precisely locate a particular interference source.

In other embodiments, spectrum information can be used to identify a type of interference based on which channels are being used at particular times.

In other embodiments, spectrum information can be used to approximate how many user equipment that are coupled to a different network are within a particular service area.

In some examples, spectrum information can be leveraged to infer foot traffic and/or vehicle traffic in a particular area.

In some embodiments, spectrum information can be used to generate one or more recommendations to a network administrator to reposition or reconfigure one or more mesh nodes. For example, if a particular mesh node experiences and/or measures significant interference, a system as described herein can be configured to leverage spectrum information (which may include beam index information, localizing interference sources) to recommend a repositioning of a particular mesh node.

In some cases, spectrum information can be used to inform how individual mesh nodes are coupled to one another. For example, in some cases, a direct path between two mesh nodes in a high interference area may be suboptimal from a throughput perspective; instead, in such embodiments, a longer path (e.g., a path including more mesh nodes) may be used to couple a particular user equipment to a core network, if that longer path experiences less interference, bandwidth may be increased at the minor expense of increased latency.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a radio access network, such as the radio access network 100 described in reference to FIG. 1 may be implemented to operate over any suitable band and/or any suitable protocol. For simplicity of description and illustration, however, the embodiments that follow reference a radio access network, implemented with a mesh topology, configured to operate over frequencies defined by the Federal Communications Commission (FCC) as the Citizens Broadband Radio Service (CBRS). Although any suitable channels and/or protocols may be used within CBRS bands, embodiments described herein contemplate use of 5G NR protocols and/or LTE protocols to communicate with user equipment located within a service area of a mesh network.

As may be known to a person of skill in the art, a cellular network—whether private access or public access—may enjoy several benefits over traditional local area networks served by Wi-Fi access points. As a result, in many circumstances, a private cellular network may be preferable to a deployment of Wi-Fi access points. For example, in an office building, subterranean infrastructure (e.g., subway/train systems), or warehouse, it may be preferable to deploy a private cellular network. Example benefits of a private cellular network over a traditional Wi-Fi deployment include, but are not limited to: carrier class quality of service controls; tighter/cleaner spectrum usage (as channel assignment decisions are coordinated by a central server, a spectrum access server, and are not left to individual access points which may interfere with one another); scheduled channel access (in lieu of carrier sensing operations which are expensive of power and computation resources at user equipment); end-to-end quality of service tagging; cellular networks are designed and optimized to support voice, video, and data transmission; larger coverage area per cellular access point; improved power efficiency at end user devices; greater spectral use efficiency compared to Wi-Fi; carrier-class security and privacy; automated authentication and registration of user equipment devices and base station devices; and so on.

In view of the foregoing, the embodiments that follow reference mesh network deployments configured to operate within CBRS bands to provide private 5G NR and/or LTE cellular networks.

Figure 2:
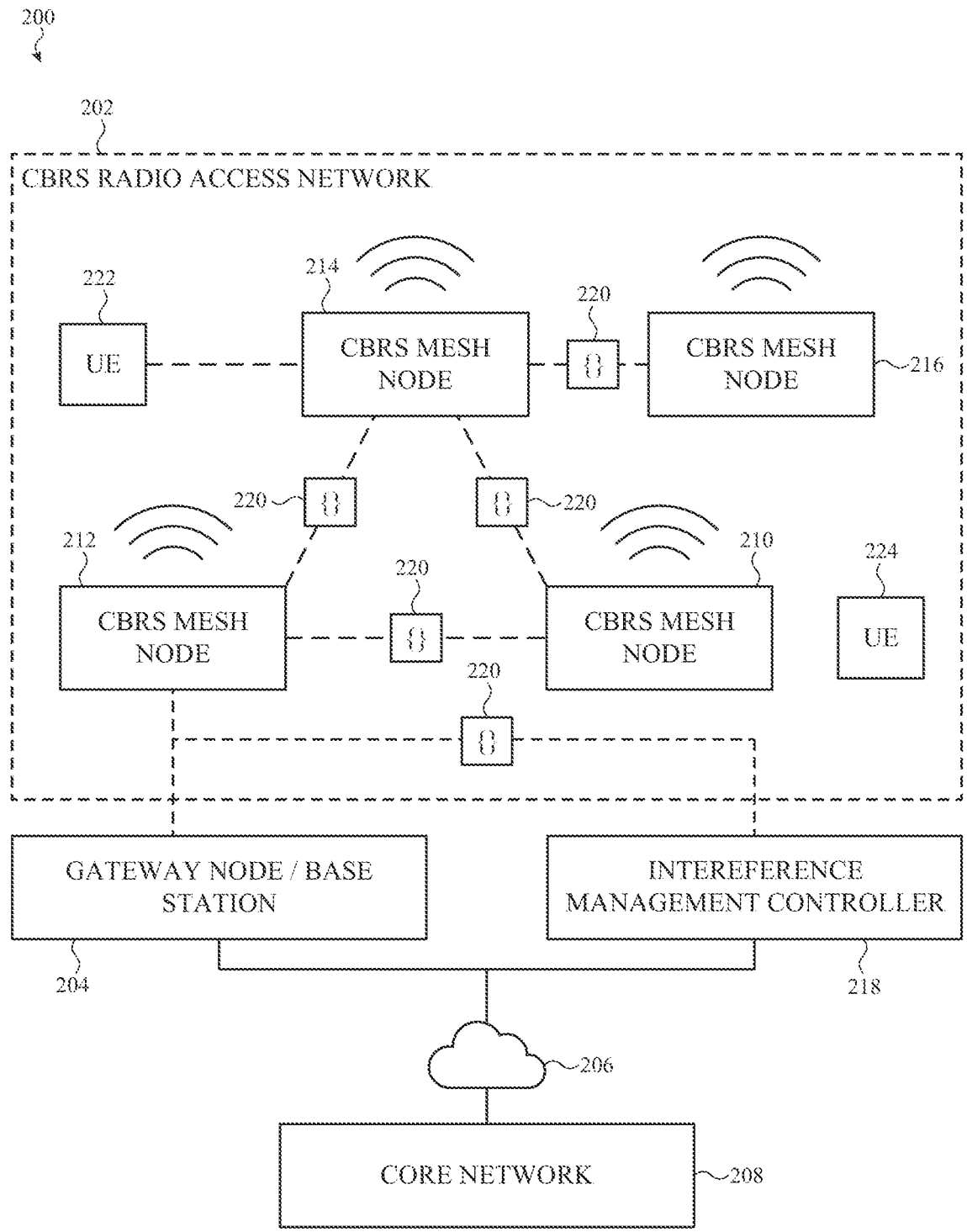
FIG. 2 depicts a system diagram of a radio access network implemented with a mesh topology, as described herein.

For example, FIG. 2 depicts a CBRS radio access network 200 implemented with mesh architecture to define a service area 202. The CBRS radio access network 200 can be configured to provide a private cellular network within the service area 202.

The mesh architecture of the CBRS radio access network 200 can be communicably coupled (in a wireless manner or a wired manner) to a base station or other gateway, identified as the gateway 204 which in turn can communicably couple, via the open internet, a virtual private network, tunnel, or other network (identified in FIG. 2 as the network 206), to a core network 208. The core network 208 can be communicably coupled to the open internet and/or a private intranet, facilitating communications between the mesh architecture of the CBRS radio access network 200 and other networks.

The mesh architecture of the CBRS radio access network 200 includes multiple mesh nodes cooperating to define the service area 202. In particular, the mesh nodes include the mesh node 210, the mesh node 212, the mesh node 214, and the mesh node 216.

As with other embodiments described herein, each of the mesh nodes 210, 212, 214, 216 can include one or more radio elements that in turn are each associated with and/or configured to operate a transmitter subsystem and a receiver subsystem. The transmitter subsystems and receiver subsystems can be co-operated with one or more self-interference cancellation subsystems that mitigate effects of transmitted signals incident upon receiver systems of the same mesh node.

The self-interference cancellation subsystems of the mesh nodes 210, 212, 214, 216 can be configured to operate in baseband, digital domain, analog domain, RF domain, optical domains, and/or acoustic domains. Many configurations are possible.

Generally and broadly, each individual mesh node operates at least one self-interference cancellation subsystem to cancel its own transmitted signals from signals itself receives. As a result of this architecture, each individual mesh node can be operated in full-duplex modes on any of one or more communication links/channels. For example, a backhaul channel coupling the mesh node 212 to the gateway 204 can be operated in a full duplex mode in which the mesh node 212 transmits information to the gateway node 204 simultaneously as it receives information from the gateway node 204. In addition, mesh channels coupling the mesh node 212 to the mesh node 210 and the mesh node 214 can be operated in full duplex modes in which the mesh node 212 transmits information to the mesh node 214 and then transmits information to the mesh node 210 at the same time the mesh node 212 is receiving information from the mesh node 214 and the mesh node 210. In this construction, as may be further appreciated, the mesh node 212 can communicate with the gateway node 204 (in full duplex) while simultaneously communicating with the mesh node 214 (in full duplex) and while simultaneously communicating with the mesh node 210.

In the foregoing described embodiments, a self-interference cancellation subsystem of the mesh node 212 can be configured to tap a feed line associated with the backhaul channel and feed lines associated with the mesh channels coupling to the mesh nodes 210 and 214. Each of these three separate taps, each corresponding to unique transmitted signals originating from the mesh node 212, can be used to create a self-interference cancellation signal that in turn can be mixed with signals received form the mesh node 210, signals received from the mesh node 214, and signals received from the gateway node 204. More generally, a self-interference cancellation subsystem as described herein is not limited to cancel interference associated with a single radio element of a mesh node; to the contrary, a self-interference cancellation subsystem (and/or a set of self-interference cancellation subsystems) can be configured to generate a single interference cancellation signal from multiple transmitted signals.

In some cases, multiple transmitted signals tapped by a self-interference cancellation subsystem as described herein (whether tapped at baseband, carrier modulated RF domain, or at any other portion of a transmitter subsystem baseband to RF chain) can be delayed in the same manner. More specifically, in some cases, a single filter bank may be configured to impart particular delays, attenuations, and so on to any input signal. In these examples, multiple tapped transmitted signals (transmitted signals associated with access channel, backhaul channel, and mesh channel communications) can be provided as input to the same filter bank. In other cases, different transmitted signals can be filtered in different and/or channel-specific ways.

In this manner, as may be appreciated by a person of skill in the art, operation of self-interference cancellation subsystems enables full-duplex modes of operation for each channel of each of the mesh nodes 210, 212, 214, 216, thereby dramatically increasing the overall throughput of the CBRS radio access network 200.

Further, as a result of operating one or more self-interference cancellation systems, continuous (and/or on a schedule or on demand) spectrum measurements and/or monitoring can be performed by each or a subset of the mesh nodes 210, 212, 214, 216. In particular, as a result of cancelling effects of self-originating transmissions, each of the mesh nodes 210, 212, 214, 216 can monitor local spectrum for other interference sources.

In these examples, the mesh nodes 210, 212, 214, 216 can be configured with a radio element specifically configured for spectrum monitoring. In other cases, spectrum monitoring functionality can be implemented by tapping one or more received signal lines.

Spectrum information as monitored or measured by the mesh nodes 210, 212, 214, 216 can be stored and/or transmitted in any suitable form or format. In some cases, spectrum information can be structured as a frequency table or channel table. In other cases, only frequencies or channels with amplitudes exceeding a threshold may be reported. A person of skill in the art may appreciate that spectrum information can be represented in a number of suitable ways.

Spectrum information can be transmitted from each of the mesh nodes 210, 212, 214, 216 to an interference management controller 218. The interference management controller 218 can be configured to receive the spectrum information 220, as structured data, from one or more of the mesh nodes of the mesh network.

The interference management controller 218 can be configured to consume and combine the spectrum information to inform spectrum and/or channel allocation decisions within the mesh network. For example, the interference management controller 218 can be configured to instruct one or more mesh nodes to utilize particular channels and/or particular protocols for particular channels/links associated with those mesh nodes. These instructions may be based, at least in part, on the spectrum information received directly from those mesh nodes.

For example, the interference management controller 218 can be configured to assign channels and/or protocols to effect maximum isolation between backhaul links and access links for each individual mesh node. In such examples, a particular mesh node may request allocation by the interference management controller 218 of a particular channel or protocol to facilitate a backhaul link and an access link. The interference management controller 218 may initially select a channel for the requesting node that is significantly different from spectrum allocated for the gateway node 204. For example, if 124 sequentially-numbered channels are available and the gateway node 204 is utilizing channel 1, the interference management controller 218 may initially allocate channel 124 to the requesting mesh node. If the channel is unavailable, a next-best determination may be made by the interference management controller 218 to assign a backhaul channel to the requesting node. A person of skill in the art may readily appreciate that this example is simplified and that single channels may not be allocated for specific purposes in all embodiments.

More generally, the interference management controller 218 can leverage spectrum information received from multiple mesh nodes to determine which channels or sets of channels are "most available" for use by a particular mesh node in a particular installed environment. Once the spectrum information is obtained, multiple non-overlapping or partially-overlapping channel sets can be assigned to a particular mesh node for establishing backhaul links, access links, and/or mesh links.

A person of skill in the art may readily appreciate that many suitable optimization algorithms may be leveraged by the interference management controller 218 to optimally assign spectrum for each channel/link necessary for operation of each mesh node of a particular mesh network deployment. In some cases, interference sources observed by a particular mesh node may be used to define a cost function associated with assigning that channel to that node; in these examples a cost minimization operation can be performed by the interference management controller 218 to determine which channels should be assigned to which mesh nodes of a mesh network.

In some cases, a mesh node may be mobile. For example, a cellular phone may be configured to operate as a mesh node as described herein. In other cases, a vehicle-to-vehicle communication system may define a mesh network as described herein. In these examples, spectrum information may change as a position of a particular mobile mesh node changes. As a result of the self-interference cancellation embodiments described herein, spectrum measurements can be taken in real time and/or at a regular intervals so that the interference management controller 218 can dynamically reallocate particular channels to particular nodes of a mesh network, either mobile or otherwise.

In some cases, the interference management controller 218 can be configured to leverage the spectrum information 220 to locate sources of interference within the service area 202. For example, a single interference source may be detected by both the mesh node 212 and the mesh node 214. In this example, the interference management controller 218 can be configured to correlate time-synchronized spectrum information received from both nodes to determine that an interference source exists physically between those two nodes. Based on relative power associated with the interference source received at each node, it may be determined to which node the interference source is physically closer.

In other cases, time-synchronized spectrum information received from multiple nodes can be filtered based on spectrum information from adjacent nodes. For example, although the mesh node 212 filters its own transmitted signals from its own measured spectrum, signals transmitted by the mesh node 212 may nevertheless be received at both the mesh node 214 and the mesh node 210. In these examples, the interference management controller 218 may be able to determine that an "interference source" observed by both the mesh node 214 and the mesh node 210 is actually the mesh node 212.

In some embodiments, each of the mesh nodes measuring spectrum information may be further configured to transmit spectrum information corresponding to signals transmitted from each respective mesh node. In other words, each mesh node can be configured to transmit spectrum information as observed by the mesh node and spectrum information of signals transmitted by the mesh node. In these embodiments, the interference management controller 218 can be configured to leverage "transmitted signal" spectrum information to filter signals transmitted from one mesh node from spectrum information observed by another mesh node.

As a result of these configurations, the interference management controller 218—which may also be referred to as, and/or perform one or more functions of, a spectrum access server in some embodiments—can be configured to dynamically assign spectrum to particular mesh nodes so as to optimize spectrum utilization efficiency and so as to minimize spectrum overlap between closely-positioned nodes.

The interference management controller 218 can be further configured in other embodiments to triangulate individual user equipment devices within a particular service area, such as the service area 202. For example, by leveraging spectrum information from the mesh nodes 214 and 212 and 210, the interference management controller 218 may be able to triangulate a position in space of the user equipment 222. In another example, by leveraging spectrum information from the mesh nodes 214, 210, and 216, the interference management controller 218 may be able to triangulate a position in space of the user equipment 224, despite that the user equipment 224 is not communicably coupled to the mesh network itself.

In this manner, in some embodiments, the interference management controller 218 can be used as or with a security system; spectrum information can be leveraged to detect presence within a service area of an unknown device, to locate that device, to assess the spectrum interference pattern to infer one or more protocols used by that device, and so on.

In other cases, spectrum information obtained by the interference management controller 218 can be used to estimate foot or vehicle traffic. In other cases, spectrum information can be used to generate one or more recommendations for repositioning a particular mesh node. Many uses are possible in view of the systems and methods described herein.

These foregoing embodiments depicted in FIG. 2 and the various alternatives thereof and variations thereto are presented, generally, for purposes of explanation, and to facilitate an understanding of various configurations and constructions of a mesh network—which may operate in CBRS bands—such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
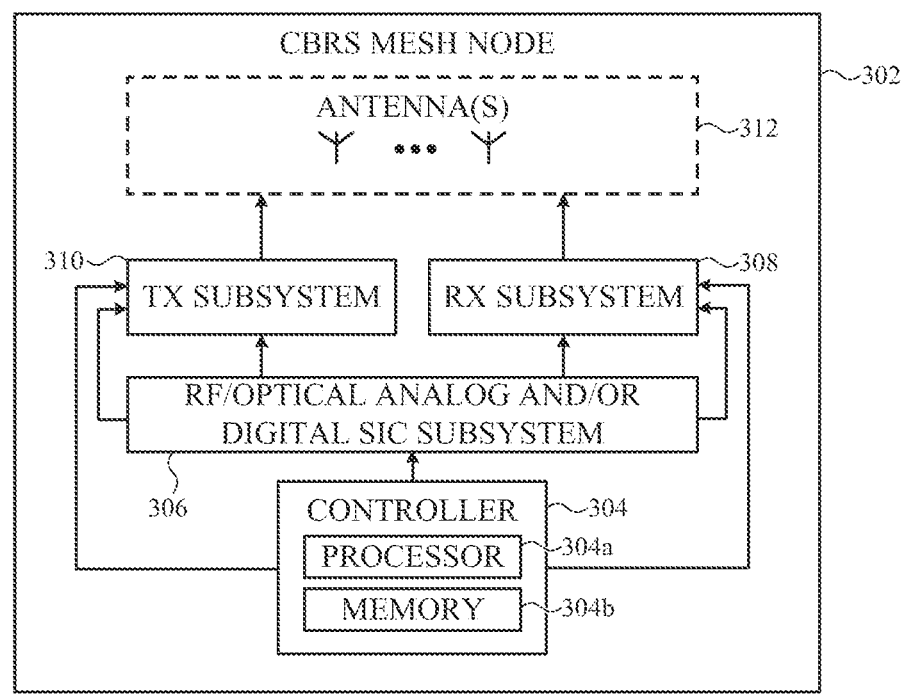
FIG. 3 depicts a system diagram of a mesh node including a self-interference cancellation subsystem, as described herein.

For example, FIG. 3 depicts a schematic diagram 300 of a mesh node 302 that can be operated in a CBRS mesh network as described herein. The mesh node 302 can be any suitable wireless communications device configured for operation in mesh network topologies, and/or may be included in any suitable electronic device including both stationary devices and mobile devices.

For example, the mesh node 302 may be and/or may be incorporated within a cellular access point, a wi-fi access point, a cellular phone, a laptop computer, a desktop computer, a point-to-point wireless link, a microwave link, a microwave communication system, a cellular communication system, a radar system, a jamming system, a telemetry system, and so on. These examples are not exhaustive.

The mesh node 302 includes a controller 304 that in turn includes a processor resource 304a and a memory resource 304b.

The processor resource 304a can be any suitable processor or processing device. As described herein, the term "processor resource" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory resource. This term is meant to encompass a single processor resource or processing unit, multiple processor resources, multiple processing units, analog or digital circuits, or other suitably configured computing element or combination of elements.

Similarly, the memory resource 304b can be any suitable memory resource or data storage device. As described herein, the term "memory resource" refers to any software and/or hardware-implemented data storage device or circuit physically and/or structurally configured to store, as examples, binary data, databases, or object data.

In many constructions, the processor resource 304a can be operably intercoupled with the memory resource 304b and can be configured to load from the memory resource 304b at least one executable asset (e.g., binaries, executable files, executable code, assembly/machine code, and so on). Upon loading the executable asset—and/or other assets or instructions—into the memory resource 304b, an instance of software may be instantiated. The instance of software may be referred to herein as a firmware application, a client application, or more generally as a controller software instance.

The controller software instance, instantiated by cooperation of the processor resource 304a and the memory resource 304b can be configured to perform and/or coordinate one or more operations of the controller 304 or, more generally, the mesh node 302.

For example, as with embodiments described above, the controller software instance can be configured to control an operation of a self-interference cancellation subsystem 306 which in turn is operably coupled to a receiver subsystem 308 and a transmitter subsystem 310. Collectively, the transmitter subsystem 310 and the receiver subsystem 208 define a radio element of the mesh node 302.

The transmitter subsystem 310 can be configured to receive, as input, a baseband signal from the controller 304 or, in some cases, from the controller software instance. The transmitter subsystem 310 can be configured to leverage an oscillator to modulate the baseband signal up to a carrier frequency suitable for wireless transmission to a remote receiver device.

As with many embodiments described herein, the transmitter subsystem 310 can be configured to implement any suitable encoding, conform to any suitable protocol (e.g., 5G NR, LTE, Wi-Fi, Bluetooth, microwave link, satellite links, and so on), and/or may be configured to operate at any suitable frequency or set of frequencies. For example, the transmitter subsystem 310 may be configured to transmit in the RF domain, the microwave domain, the mm wave domain, or any other suitable wireless domain.

Similar to the transmitter subsystem 310, the receiver subsystem 308 can be configured to receive a signal from a remote source. Also as with the transmitter subsystem 310, the receiver subsystem 308 can be configured to leverage an oscillator, which may be the same or different from oscillator (s) leveraged by the transmitter subsystem 310, to sample and/or shift to baseband, the received signal. Thereafter, the received signal can be provided for further processing and/or error correction to the controller software instance and/or another component of the mesh node 302.

As with the transmitter subsystem 310, the receiver subsystem 308 can likewise be configured to implement any suitable encoding, conform to any suitable protocol (e.g., 5G NR, Wi-Fi, Bluetooth, microwave link, satellite links, and so on), and/or may be configured to operate at any suitable frequency or set of frequencies.

For example, the receiver subsystem 308 may be configured to receive in the RF domain, the microwave domain, the mm wave domain, or any other suitable wireless domain. In many cases, the receiver subsystem 308 is configured to operate in a band that overlaps with the transmitter subsystem 310.

In some cases, the mesh node 302 can be configured to operate in full duplex mode in which the receiver subsystem 308 is configured to receive one or more signals at the same time the transmitter subsystem 310 is transmitting a signal. In other cases, time multiplexing may be used to share bandwidth resources.

As noted above, the mesh node 302 can further include the self-interference cancellation subsystem 306 that is configured to receive input from the transmitter subsystem 310 to generate one or more cancellation signals that in turn can be provided as input to the receiver subsystem 308. The receiver subsystem 308 can combine the cancellation signals with one or more signals received by the receiver subsystem 308 in order to destructively interfere with reflections of signals transmitted by the transmitter subsystem 310 that echo back to the receiver subsystem 308.

In this manner, a transmitted signal generated by the transmitter subsystem 310 and provided via a feed line to one or more antennas 312 can be used to inform generation of one or more cancellation signals (e.g., delayed, attenuated, distorted, inverted, or otherwise modified versions of the transmitted signal) that in turn can be combined with a received signal received at the one or more antennas 312, and conductively coupled into the receiver subsystem 308. The cancellation signals can destructively interfere with echoes of the transmitted signal, thereby reducing self-interference effects.

As noted above, it may be appreciated that the self-interference cancellation subsystem 306 can operate in a number of different domains. For example, in some embodiments, the self-interference cancellation subsystem 306 can generate an RF-domain cancellation signal that is combined with a receive signal prior to sampling or other demodulation. In other cases, the self-interference cancellation subsystem 306 can be configured to generate a cancellation signal in the digital domain, cancelling interference at baseband.

In yet other examples, the self-interference cancellation subsystem 306 can be configured to generate an interference cancellation signal at an intermediate frequency between a carrier frequency and baseband. These examples are not exhaustive; it may be appreciated by a person of skill in the art that self-interference cancellation operations can be performed in a number of different ways, leveraging a number of suitable architectures and techniques.

These foregoing embodiments depicted in FIG. 3 and the various alternatives thereof and variations thereto are presented, generally, for purposes of explanation, and to facilitate an understanding of various configurations and constructions of a mesh node including a self-interference cancellation subsystem that may be included in a mesh network, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
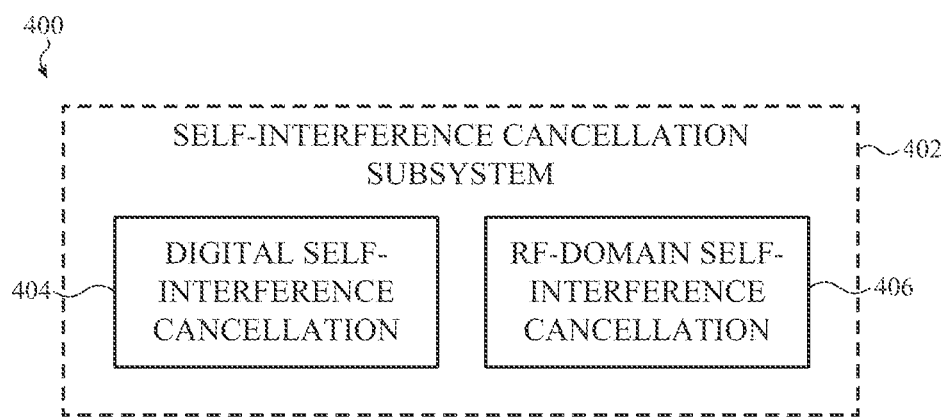
FIG. 4A depicts a simplified system diagram of a self-interference cancellation subsystem of a mesh node, as described herein.

For example, as noted above, it may be appreciated that a self-interference cancellation subsystem as described herein can operate in multiple domains. FIG. 4A is provided as a simplified system diagram 400 of a self-interference cancellation subsystem 402, such as may be included in a mesh node as described herein. The self-interference cancellation subsystem 402 includes a digital self-interference cancellation submodule 404 which may be configured to operate in baseband, and an RF domain (analog) self-interference cancellation submodule 406, which may be configured as noted above to leverage one or more photonic circuits and/or waveguide loops/delay elements to provide for self-interference cancellation in the RF domain.

Further, it may be appreciated in view of the foregoing and following embodiments that a mesh node as described herein can include multiple discrete radio elements which can have dedicated transmitter and receiver subsystems or may share transmitter and receiver subsystems.

Figure 4B:
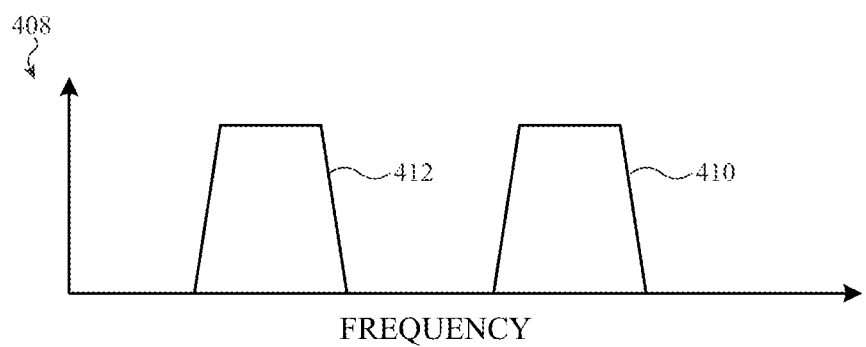
FIGS. 4B-4C depict simplified frequency diagrams illustrating self-interference cancellation bands and spectrum monitoring bands.
Figure 4C:
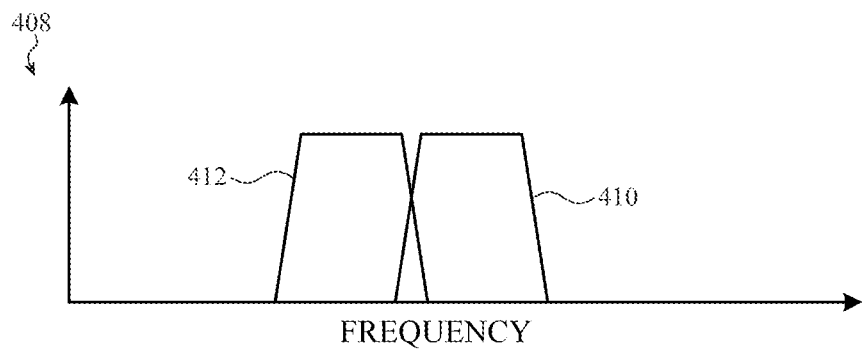

It may be further appreciated that in some embodiments, self-interference cancellation and spectrum sensing may operate in different bands. For example, FIG. 4B depicts a diagram 408 that corresponds to operation of a mesh node as described herein in which a spectrum sensing band 410 differs from, and does not overlap with, a self-interference cancellation band 412. In these examples, the mesh node may be configured to observe spectrum within a particular band that does not overlap with band(s) in which the mesh node is transmitting and/or receiving signals. In other cases, self-interference cancellation and spectrum sensing bands may partially (or entirely) overlap such as shown in FIG. 4C.

In some cases, self-interference cancellation may not be required to operate in order to sense spectrum within a particular band. For example, in some cases, a self-interference cancellation system may be disabled periodically (for power savings or another reason), and spectrum sensing may be performed in a band-limited manner.

In some embodiments, a mesh node may leverage spectrum sensing to improve channel hopping. For example, a radio element may be configured (e.g., via configuration received from a network or gateway device and/or during a cell search operation) to transmit and/or receive signals on a particular known sequence of channels. More simply, the radio element can transmit and/or receive on a first channel for a first period of time, after which radio elements can be retuned to transmit and/or receive on a second channel for a second period of time after which radio elements can be retuned to transmit and/or receive on a third channel for a third period of time.

In these channel switching embodiments, spectrum sensing can be configured to lead channel switching/retuning operations. For example, spectrum sensing can be used to determine interference over the next channel (or another future channel) for a particular radio element. If interference is detected, the channel plan for the radio element may be adjusted or otherwise modified so as to not experience the measured interference.

In other cases, spectrum sensing can be configured to follow channel switching operations so as to detect interference on previously-used channels. This information can be used to infer whether the radio element itself is likely interfering with operation of other devices in the same radio environment.

In these and other examples, a radio element may be configured to detect and/or recognize particular sources or types of interference. In some cases, if particular types of interference are recognized, the radio element can automatically self-configure to evacuate one or more channels. For example, as known to a person of skill in the art, certain U.S. Government organizations and systems (e.g., Navy radar systems) may have priority access to certain channels within CBRS bands; in such cases if Navy interference is recognized, a radio element as described herein can automatically self-configure to evacuate particular channels or particular bands. As may be appreciated by a person of skill in the art, a mesh network configured in this manner may effectuate evacuation of particular channels exceptionally quickly (on the order of seconds or sub-second intervals), compared to conventional cellular networks which may require upwards of minutes to evacuate particular channels for the benefit of priority access parties.

Figure 5:
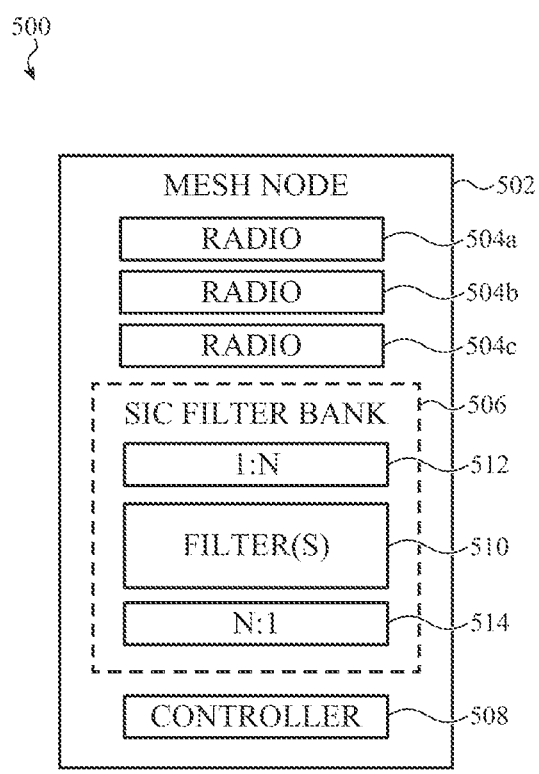
FIG. 5 depicts a simplified system diagram of a mesh node including multiple radio communications subsystems and a self-interference cancellation subsystem, as described herein.

FIG. 5 depicts a simplified system diagram 500 of a mesh node including multiple radio elements. In this example, the mesh node 502 can include one or more cellular network radio elements, such as a customer premises equipment radio (CPE), a small cell radio, and/or a Wi-Fi access point. Three example radio elements are identified in the figure as the radio elements 504a, 504b, and 504c. Any one of these radio elements can be configured to provide a backhaul link, an access link, and/or a mesh administration link as described above. In these constructions, the mesh node 502 can be positioned substantially anywhere a power connection is available. In some examples, the mesh network 502 may be battery operated and/or may include an off-grid power supply, such as a solar array or generator. These examples are not exhaustive.

The mesh node 502 can also include a self-interference cancellation subsystem defined at least in part by a filter bank 506, including a number of selectable filters (e.g., delay elements).

The filter bank 506 and/or the radio elements can be operably coupled to a controller 508 configured to perform, coordinate, or execute one or more operations thereof. The filter bank 506 can include many selectable filter element arrays 510 that can be selectively leveraged to apply delays to one or more copies of an input signal. In other cases, the selectable filter element array 510 can include one or more filters that provide other filtering to an input signal, such as band pass filtering, high pass filtering, phase shifting, low pass filtering, and so on. The selectable filter element array 510 can include any suitable number of filters.

For example, an input signal (tapped from a transmitter subsystem feed line) can be provided as input to a splitter 512. Each output of the splitter can be provided as input to a different filter element implementing a different selectable delay to that particular copy (power division) of the input transmit signal.

Once delays are applied by the selectably-enabled filter elements, a mixer 514 can be used to merge all delayed signals into a single self-interference cancellation signal which in turn can be mixed with one or more received signals, such as signals received by the radio elements of the mesh node 502.

These foregoing embodiments depicted in FIGS. 4-5 and the various alternatives thereof and variations thereto are presented, generally, for purposes of explanation, and to facilitate an understanding of various configurations and constructions of a mesh node, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
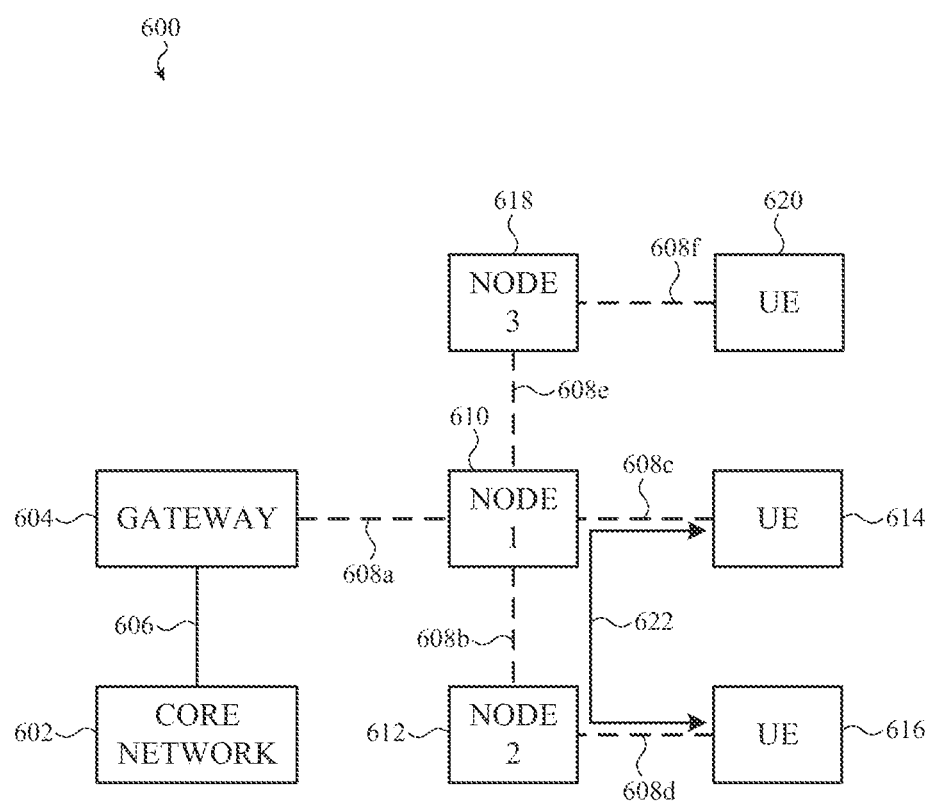
FIG. 6 depicts a simplified network diagram of a mesh network facilitating user equipment to user equipment communications.

For example, a mesh network as described herein can be configured to cancel self-originating interference. For example, FIG. 6 depicts an example graph 600 of a mesh network such as described herein. The mesh network can facilitate access to a core network 602 via a gateway node 604. The gateway node 604 can be coupled to the core network 602 via any suitable coupling, such as a wired connection 606.

The gateway node 604 can serve as a backhaul connection for one or more nodes. More particularly, the gateway node 604 may be a node of the graph 600, and can be communicably associated to other nodes of the mesh network via edges of the graph 600.

For example, an edge 608a can correspond to a wired or wireless coupling between the gateway node 604 and a mesh node 610. The edge 608a may be a backhaul link coupling the gateway node 604 and the mesh node 610. In other cases, the edge 608a may be a mesh link over which command and control instructions are exchanged between the gateway node 604 and the mesh node 610. Many constructions are possible.

An edge 608b can correspond to a wired or wireless coupling between the mesh node 610 and a mesh node 612. The edge 608b can be a mesh link over which command and control instructions are exchanged between the mesh node 610 and the mesh node 612. In some cases, the edge 608b may serve as a backhaul link for the mesh node 612. Many constructions are possible.

The mesh node 610 can serve as an access point, via an edge 608c, to a user equipment 614. Similarly, the mesh node 612 can serve as an access point via an edge 608d to a user equipment 616.

As a result of this construction, the user equipment 614 can couple to the core network 602 via the edge 608c, the mesh node 610, the edge 608a, the gateway node 604, and the wired connection 606. Similarly, the user equipment 616 can couple to the core network 602 via the edge 608d, the mesh node 612, the edge 608b, the mesh node 610, the edge 608a, the gateway node 604, and the wired connection 606.

The mesh network can also include a mesh node 618 coupled to the node 610 via an edge 608e. The mesh node 618 can couple to a user equipment 620 via an edge 608f. In this manner, the mesh nodes 610, 612, and 618 cooperatively define a service area that serves the user equipments 616, 614, and 620.

In addition, as a result of the mesh network topology, direct device-to-device communications can be facilitated.

For example, the user equipment 614 can be directly communicably coupled to the user equipment 616 via a path 622. In this example, the user equipment 614 may initiate a voice call or a video call targeted to the user equipment 616. As a result of the mesh architecture, the video call or voice call can be connected through nodes of the mesh network, such as the mesh node 610 and the mesh node 612. The path 622 may be the shortest length path between the user equipments determined by Dijkstra's algorithm or a similar pathfinding algorithm. In other cases, the path 622 may be the lowest latency path, or the highest bandwidth path. A person of skill in the art may understand many possible operations for finding a device-to-device communications path through a mesh network (or, more generally, between nodes of a graph data structure, exist.

These foregoing embodiments depicted in FIGS. 1-6 and the various alternatives thereof and variations thereto are presented, generally, for purposes of explanation, and to facilitate an understanding of various configurations and constructions of a mesh network and nodes that make up the same, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, many embodiments described herein correspond to and/or may be associated with various methods of operation of a mesh node and/or mesh network as described herein.

Figure 7:
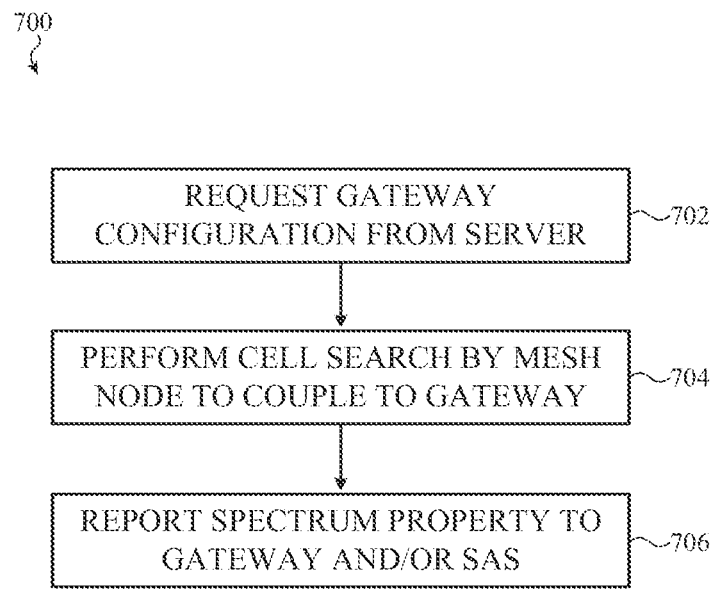
FIG. 7 is a flowchart depicting example operations of another method of operating a mesh network, as described herein.

FIG. 7 is a flowchart depicting example operations of another method of operating a mesh network, as described herein. The method 700 can be performed by any suitable hardware or software, or combination thereof, either in whole or in part. In many constructions the method 700 can be performed by an instance of controller software instantiated by cooperation of a processor resource and a memory resource of a mesh node, such as described herein. In other cases, different components of a mesh network can perform or coordinate different portions of the method 700.

The method 700 includes operation 702 in which a node configuration is requested from a command and control apparatus or appliance, which may be implemented as a server communicably coupled to a core network or a private cellular network. The node configuration may be a file or other structured data that defines at least one operational mode of a mesh node or a gateway node of a mesh network, such as described herein. For simplicity of description, the method operations that follow reference a gateway configuration file request, but it may be appreciated that this is merely one example.

The method 700 includes operation 704 at which a cell search operation is performed by one or more mesh nodes. As known to a person of skill in the art, cell search operations performed may differ based on protocol; an LTE cell search operation may differ from a 5G NR cell search operation.

In the case of 5G NR, before an unassociated mesh node can communicate with and/or perform measurements related to an existing connection with a 5G NR network or a network-associated mesh node/cell, the unassociated mesh node must perform one or more cell search operations to obtain basic network, cell, and/or system information.

This synchronization information is necessary to communicably couple to one or more mesh node/cells of a particular 5G NR network so that the unassociated mesh node can transmit and/or receive information via the network. After synchronization information is obtained by the unassociated mesh node, the now-associated mesh node may camp on a particular mesh node/cell (and/or communicably couple to other mesh nodes nearby, as directed by configuration files/configuration requests and/or as directed by a spectrum access server of the network) and thereafter monitor system information of the camped mesh node/cell and/or neighboring mesh node/cells to determine (according to node-specific or network-specific rules or criteria) whether reselection should be performed.

In other cases, the now-associated mesh node may be mobile and may periodically initiate or perform, or participate in, one or more handover or reselection procedures to reassociate to different subsets of mesh nodes. More specifically, a mesh node configured to operate in a 5G NR network may be configured to detect downlink Synchronization Signals (SS) in a Synchronization Signal Block (SSB) transmitted by one or more mesh nodes of the 5G NR network.

The method 700 further includes operation 706 at which the now-associated mesh node monitors and/or takes one or more measurements of local spectrum. The measurements may be taken continuously, periodically, or on demand. The spectrum information can be band limited to one or more bands of interest. The spectrum information can include frequency-specific amplitude, channel occupancy, or any other suitable spectrum related information or data. The spectrum information can be transmitted to a gateway and/or to a spectrum access server.

Figure 8:
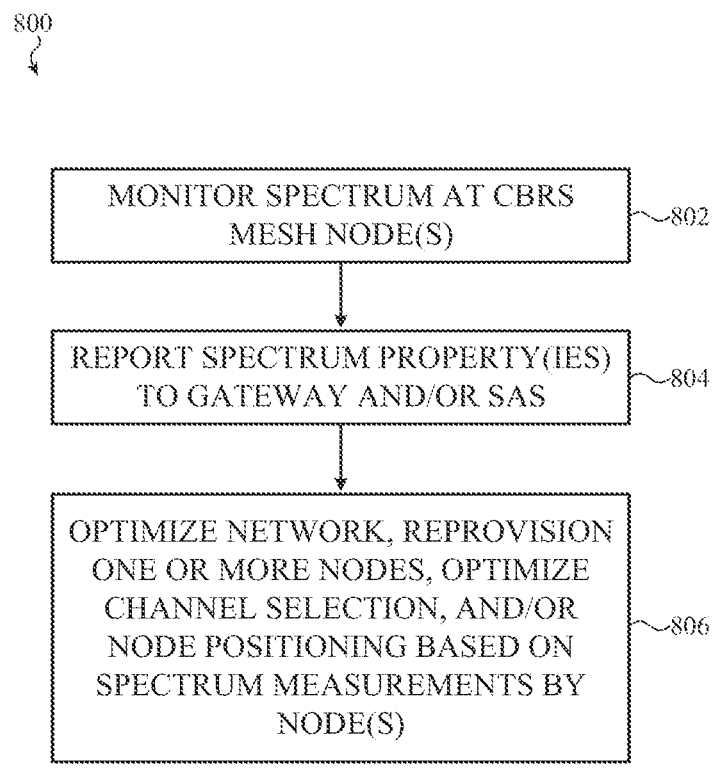
FIG. 8 is a flowchart depicting example operations of another method of operating a Citizens Broadband Radio Service (CBRS) mesh network to detect spectrum characteristics local to one or more mesh nodes, as described herein.

FIG. 8 is a flowchart depicting example operations of another method of operating a CBRS mesh network to detect spectrum characteristics local to one or more mesh nodes, as described herein. The method 800, similar to the method 700, can be performed by any suitable hardware, software, or a combination thereof.

The method 800 includes operation 802 at which a mesh node of a CBRS mesh network continually monitors spectrum local to the mesh node. At operation 804, the method 800 advances to report spectrum information to a gateway device and/or to a spectrum access server. The spectrum information can include one or more properties describing an aspect of spectrum utilization as detected by the mesh node. For example, the mesh node may be configured to transmit to a spectrum access server a binary value indicating a prediction of whether a particular channel is occupied or otherwise used. In other cases, a frequency table can be transmitted, correlating amplitude values to individual frequency components or channels of one or more known or detectable protocols.

The method 800 further includes operation 806 at which a recipient device of spectrum information (e.g., a gateway device or spectrum access server) can be configured to initiate an optimization procedure based on the spectrum information to reconstruct the mesh network to improve efficiency and/or to avoid interference sources identified by the spectrum information. The reconstruction operation can include optimizing channel information (e.g., backhaul links, access links, mesh links, and so on), reprovisioning/reconfiguring one or more mesh nodes, and/or generating one or more suggestions to move or reposition at least one mesh node so as to avoid an interference source.

Figure 9:
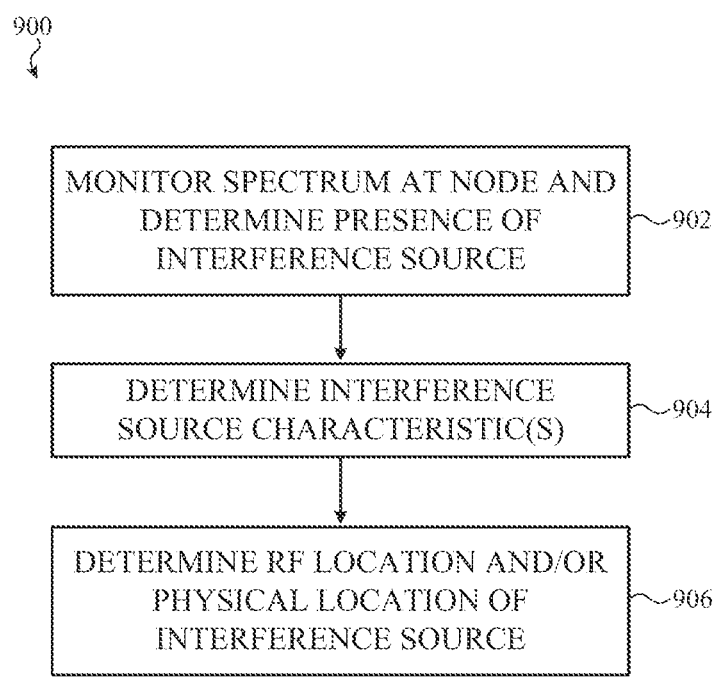
FIG. 9 is a flowchart depicting example operations of a method of locating an interference source, in a mesh network, as described herein.

FIG. 9 is a flowchart depicting example operations of a method of locating an interference source, in a mesh network, as described herein. As with preceding methods, the method 900 can be performed in whole or in part by any suitable hardware or software; in many cases, the method may be performed by a mesh node as described herein.

The method 900 includes operation 902 at which spectrum local to a mesh node is monitored, such as described above (e.g., monitored while operating a self-interference cancellation subsystem). The spectrum information can be analyzed to identify one or more sources of interference local to the monitoring mesh node.

The method 900 includes operation 904 at which one or more characteristics of the interference may be determined, predicted, or otherwise obtained. In some examples, a trained machine learning model can be used to label one or more characteristics of the observed interference, which may result in an output tagging the interference as likely from a particular user equipment, user equipment type, or communication protocol identifier. In other words, a trained machine learning model (or other suitably configured AI/classification system) can be leveraged to tag spectrum information with categories and/or properties corresponding to likely sources of that interference.

The method 900 includes operation 906 at which the interference source may be physically located by triangulating spectrum information received from multiple mesh nodes and/or may be located in the frequency domain to determine which bands may be occupied or otherwise unavailable for use by the mesh network.

Figure 10:
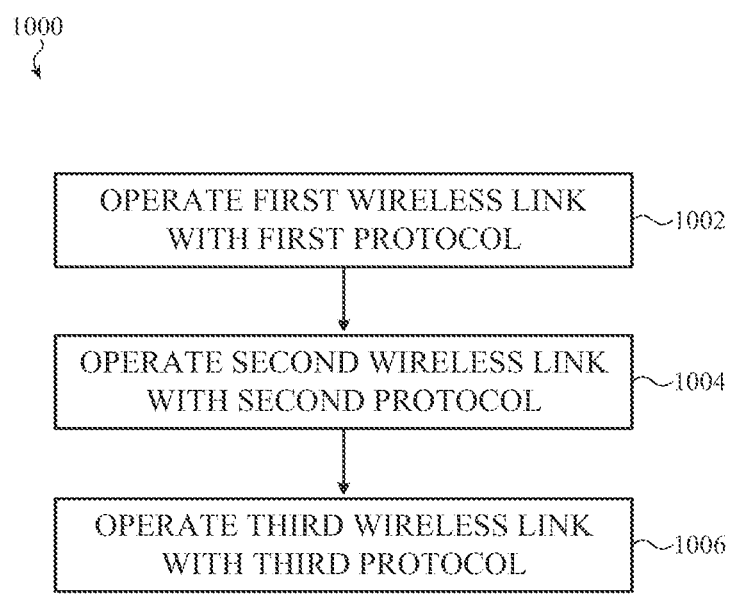
FIG. 10 is a flowchart depicting example operations of a method of operating a mesh node in multiple bands in a mesh network, as described herein.

FIG. 10 is a flowchart depicting example operations of a method of operating a mesh node in multiple bands in a mesh network, as described herein. As with other methods described herein, the method 1000 can be performed in whole or in part by any suitable hardware or software; in many cases, the method may be performed by a mesh node as described herein.

The method 1000 includes operation 1002 in which a first wireless link associated with a mesh node is operated with and/or in compliance with a first protocol. At operation 1004, a second wireless link associated with the same mesh node is operated with and/or in compliance with a second protocol. The second protocol may be different from the first protocol. At operation 1006, a third wireless link associated with the same mesh node can be operated with and/or in compliance with a third protocol. The third protocol may be different from the first protocol and the second protocol.

For example, a backhaul link of a mesh node in a private cellular network can be implanted with microwave point to point communications. In other cases, an access link can be implemented in compliance with Wi-Fi standards. In yet other examples, a mesh control link can be implemented in compliance with 5G NR standards.

Figure 11:
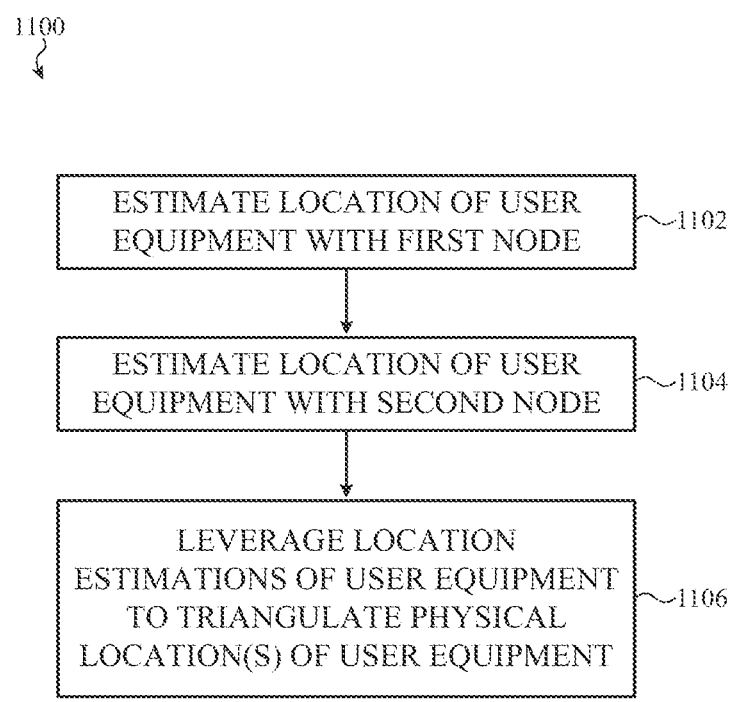
FIG. 11 is a flowchart depicting example operations of a method of triangulating a position of a user equipment in a mesh network, as described herein.

FIG. 11 is a flowchart depicting example operations of a method of triangulating a position of a user equipment in a mesh network, as described herein. As with preceding methods, the method 1100 can be performed in whole or in part by any suitable hardware or software; in many cases, the method may be performed by a mesh node as described herein.

The method 1100 includes operations 1102 and 1104 at which a physical location of a user equipment device is determined by a first mesh node and a second mesh node, respectively. In some cases, received signal strength indications and/or beam indexes can be leveraged to approximately locate a particular user equipment by either the first mesh node or the second mesh node.

The method 1100 includes operation 1106 at which the location estimations provided by the first mesh node and the second mesh node can be used with at least one other location estimation provided by a third mesh node to triangulate a position in space of the user equipment.

These foregoing embodiments depicted in FIGS. 1-11 and the various alternatives thereof and variations thereto are presented, generally, for purposes of explanation, and to facilitate an understanding of various configurations and constructions of a system, network, and node, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A wireless communications device comprising:
   a first radio element comprising:
      a transmitter subsystem; and
      a first receiver subsystem;
   a second radio element comprising a second receiver subsystem;
   an antenna array operably coupled to the first radio element and the second radio element; and
   a controller comprising a processor resource and a memory resource configured to co-operate to instantiate an instance of software configured to:
      operate the second receiver subsystem of the second radio element as a spectrum sensor to continually monitor spectrum nearby the wireless communications device itself; and
      operate the transmitter subsystem to report spectrum information to a server in communication with the first radio element.

2. The wireless communications device of claim 1, comprising a self-interference cancellation subsystem operably coupled to the transmitter subsystem and the first receiver subsystem and configured to generate a self-interference cancellation signal from a transmit signal tapped from the transmitter subsystem and to apply the self-interference cancellation signal to a received signal received by the first receiver subsystem.

3. The wireless communications device of claim 1, wherein the first radio element operates in a first band and the instance of software is configured to operate the second receiver subsystem of the second radio element to monitor spectrum in a second band.

4. The wireless communications device of claim 3, wherein the first band overlaps the second band.

5. The wireless communications device of claim 3, wherein the first band is separate from the second band.

6. The wireless communications device of claim 1, wherein the first radio element is configured to operate over a cellular communication protocol.

7. The wireless communications device of claim 6, wherein the cellular communication protocol comprises at least one of Long Term Evolution (LTE) or 5G New Radio (5G NR).

8. A node for a mesh network, the node comprising:
a first radio element defining a first communication link;
a second radio element defining a second communication link;
a third radio element defining a third communication link;
a self-interference cancellation subsystem operably coupled to at least one of the first radio element, the second radio element, or the third radio element and configured to generate a self-interference cancellation signal to apply to a received signal received by at least one of the first radio element, the second radio element, or the third radio element; and
a controller configured to:
operate at least one of the first radio element, the second radio element, or the third radio element as a spectrum sensor to monitor spectrum local to for interference sources nearby the node itself; and
report spectrum information to a server over one of the first communication link, the second communication link, or the third communication link.

9. The node of claim 8, wherein:
the first communication link is a backhaul link;
the second communication link is an access link; and
the third communication link is a mesh administration link.

10. The node of claim 8, wherein the first radio element is configured to operate over a first wireless protocol and the second radio element is configured to operate over a second wireless protocol.

11. The node of claim 10, wherein the first wireless protocol is different from the second wireless protocol.

12. The node of claim 10, wherein the first wireless protocol operates in a first band and the second wireless protocol operates in a second band.

13. The node of claim 12, wherein the first band is separate from the second band.

14. The node of claim 8, wherein the server is a spectrum access server.

15. The node of claim 14, wherein the controller is configured to receive, from the spectrum access server, a spectrum allocation for at least one of the first communication link, the second communication link, or the third communication link.

16. The node of claim 8, wherein the self-interference cancellation subsystem comprises a filter bank comprising a set of configurable filter elements.

17. The node of claim 16, wherein at least one configurable filter element comprises a band pass filter.

18. A method of operating a mesh node of a mesh network, the method comprising:
operating a first radio element to maintain a mesh link with at least one other node of the mesh network;
operating a second radio element to maintain a backhaul link with a gateway node of the mesh network;
operating a third radio element to maintain an access link with a user equipment;
operating a self-interference cancellation subsystem to generate a self-interference cancellation signal by tapping a feed line of at least one of the first radio element, the second radio element, or the third radio element;
combining the self-interference cancellation signal with at least one receiver subsystem of at least one of the first radio element, the second radio element, or the third radio element;
continually monitoring spectrum nearby the mesh mode to identify interference sources nearby the mesh node with at least one of the first radio element, the second radio element, or the third radio element;
reporting, via the backhaul link, spectrum information to an interference management server; and
receiving, from the interference management server, at least one channel assignment for at least one of the backhaul link, the mesh link, or the access link.

19. The method of claim 18, wherein the backhaul link, the mesh link, or the access link operate over different wireless protocols.

20. The method of claim 18, wherein continually monitoring the spectrum comprises monitoring spectrum in a band separate from a band of at least one of the backhaul link, the mesh link, or the access link.

\* \* \* \* \*